(12) United States Patent
Zhang

(10) Patent No.: US 12,488,849 B2
(45) Date of Patent: Dec. 2, 2025

(54) ANTI-FUSE CIRCUIT AND ANTI-FUSE UNIT PROGRAMMING STATE VERIFICATION METHOD

(71) Applicant: ChangXin Memory Technologies, Inc., Hefei (CN)

(72) Inventor: Jiarui Zhang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 18/036,081

(22) PCT Filed: Oct. 19, 2022

(86) PCT No.: PCT/CN2022/126176
§ 371 (c)(1),
(2) Date: May 9, 2023

(87) PCT Pub. No.: WO2023/221389
PCT Pub. Date: Nov. 23, 2023

(65) Prior Publication Data
US 2024/0339165 A1  Oct. 10, 2024

(30) Foreign Application Priority Data

May 19, 2022 (CN) .......................... 202210546482.5

(51) Int. Cl.
*G11C 17/18* (2006.01)
*G11C 17/16* (2006.01)

(52) U.S. Cl.
CPC .............. *G11C 17/18* (2013.01); *G11C 17/16* (2013.01)

(58) Field of Classification Search
CPC ..................................................... G11C 17/18
(Continued)

(56) References Cited

U.S. PATENT DOCUMENTS

| | | | | |
|---|---|---|---|---|
| 6,150,868 A | * | 11/2000 | Kim | G11C 17/18 365/96 |
| 6,240,033 B1 | * | 5/2001 | Yang | G11C 29/781 365/96 |
| 6,788,587 B2 | * | 9/2004 | Van De Graaff | G11C 17/16 365/225.7 |

FOREIGN PATENT DOCUMENTS

| | | |
|---|---|---|
| CN | 101425341 B | 2/2013 |
| CN | 110136768 A | 8/2019 |

OTHER PUBLICATIONS

PCT/CN2022/126176 International Search Report mailed Feb. 14, 2023.

* cited by examiner

*Primary Examiner* — Muna A Techane
(74) *Attorney, Agent, or Firm* — SYNCODA LLC; Feng Ma

(57) ABSTRACT

An embodiment of the present disclosure provides an anti-fuse circuit, including: an anti-fuse unit; a programming circuit connected to the anti-fuse unit, and the programming circuit performs programming of the anti-fuse unit according to the programming control signal and the programming signal; the read unit reads the anti-fuse unit to obtain a data signal; the verification control unit controls the electrical connection between the reading unit and the anti-fuse unit according to the verification enable signal and the programming signal of the anti-fuse unit, when verifying the programming state of the anti-fuse unit. When the anti-fuse circuit verifies the programming state of the anti-fuse unit, it controls the electrical connection between the read unit and the anti-fuse unit according to the verification enable signal and the programming signal of the anti-fuse unit, to realize real-time verification of programming status.

19 Claims, 5 Drawing Sheets

(58) Field of Classification Search
USPC .......................................................... 365/96
See application file for complete search history.

| Data | Programming state of the anti-fuse unit | EFOUT | Verification Result |
|---|---|---|---|
| 1 | Not programmed yet | 1 | programming is correct |
| 1 | Being programmed | 0 | programming is incorrect |

ANTI-FUSE CIRCUIT AND ANTI-FUSE UNIT PROGRAMMING STATE VERIFICATION METHOD

CROSS REFERENCES TO RELATED APPLICATIONS

This application claims the priority of the Chinese patent application No. 202210546482.5 filed on May 19, 2022, and entitled "Anti-fuse Circuit and Anti-fuse Unit Programming State Verification Method", the contents of which are incorporated herein by reference in its entirety.

TECHNICAL FIELD

The invention relates to the field of integrated circuits, in particular to an anti-fuse circuit and a method for verifying the programming state of an anti-fuse unit.

BACKGROUND

In the semiconductor industry, fuse elements are widely used in integrated circuits due to their multiple applications. For example, multiple circuit modules with the same function are designed in the integrated circuit as a backup. When one of the circuit modules is found to be invalid, the circuit modules and other functional circuits in the integrated circuit are burned through the fuse element, and another circuit module with the same function replaces the failed circuit module.

With the continuous development of semiconductor technology, anti-fuse technology has attracted the attention of many inventors and manufacturers. Anti-fuse elements store information by changing from an insulating state to a conducting state. Writing information to the anti-fuse element is performed by dielectric breakdown caused by application of high voltage. The anti-fuse memory cell has a capacitive characteristic before programming, and no conduction channel is formed; when a programming breakdown occurs, a conduction channel will be formed at both ends of the cell, through which current can pass, and the magnitude of the conduction current is related to the programming effect.

However, the existing anti-fuse circuit cannot realize the real-time verification of the anti-fuse unit, thus cannot meet the demand.

SUMMARY

The technical problem to be solved by the embodiments of the present disclosure is to provide an anti-fuse circuit and a method for verifying the programming status of the anti-fuse, which can verify the programming status of the anti-fuse unit in real time.

To solve the above problems, an embodiment of the present disclosure provides an anti-fuse circuit, which includes: an anti-fuse unit; a programming circuit connected to the anti-fuse unit, and the programming circuit controls the signal and the programming signal program the anti-fuse unit; the read unit reads the anti-fuse unit to obtain a data signal; the verification control unit verifies the anti-fuse unit in the programming state, the read unit is controlled to be electrically connected to the anti-fuse unit according to the verification enable signal and the programming signal.

In one embodiment, the verification control unit includes: a first transistor, a first terminal of the first transistor is connected to the anti-fuse unit, a second terminal of the first transistor is connected to the read unit input terminal is connected; the signal receiving unit includes a first input terminal, a second input terminal and an output terminal, the first input terminal of the signal receiving unit receives the programming signal, and the second input terminal of the signal receiving unit Receive the verification enable signal, the output terminal of the signal receiving unit is electrically connected to the control terminal of the first transistor, when verifying the programming state of the anti-fuse unit, when the programming signal representing the anti-fuse unit is not burned through, and the signal receiving unit controls the first transistor to be turned on.

In an embodiment, the first transistor is an NMOS transistor.

In one embodiment, the signal receiving unit includes: a NAND gate, the output terminal of the NAND gate is used as the output terminal of the signal receiving unit; a first inverter, the first input of the signal receiving unit terminal is electrically connected to one input terminal of the NAND gate through the first inverter, and the other input terminal of the NAND gate is electrically connected to the second input terminal of the signal receiving unit.

In one embodiment, the first transistor is a PMOS transistor.

In one embodiment, the signal receiving unit includes: a NAND gate, the two input terminals of the NAND gate are respectively electrically connected to the first output terminal and the second input terminal, and the output terminal of the NAND gate serves as the output terminal of the signal receiving unit.

In one embodiment, the anti-fuse unit includes a first terminal and a second terminal, the first terminal of the anti-fuse unit is grounded, and the second terminal of the anti-fuse unit is connected to the read unit. The input terminals are electrically connected.

In an embodiment, the read unit includes: a pre-charge unit, configured to pre-charge the input terminal of the read unit according to a pre-charge control signal; a latch, the input terminal of the latch is connected to the input terminal of the read unit is electrically connected, and the output terminal of the latch is electrically connected to the output terminal of the read unit.

In one embodiment, the pre-charging unit includes a second transistor, the first terminal of the second transistor is connected to the power supply voltage, the second terminal of the second transistor is connected to the input terminal of the read unit, and the second transistor is connected to the input terminal of the read unit. The gate of the second transistor receives the pre-charge control signal.

In one embodiment, the anti-fuse circuit further includes a read switch unit, the read switch unit controls the input terminal of the read unit and the second terminal of the anti-fuse unit according to the read enable signal electrical connection.

In an embodiment, the read switch unit includes a third transistor, the first terminal of the third transistor is connected to the second terminal of the anti-fuse unit, and the second terminal of the third transistor is connected to the gate of the third transistor to receive the read enable signal.

In an embodiment, the read unit further includes a second inverter, and the second inverter is disposed between the latch and the output terminal of the read unit.

An embodiment of the present disclosure also provides a method for verifying the programming state of an anti-fuse unit, using the above-mentioned anti-fuse circuit, the method includes: inputting a programming signal, and performing a program on the anti-fuse unit according to the programming signal; controlling the electrical connection between the read unit and the anti-fuse unit according to the programming signal and the verification enable signal; the read unit reads the anti-fuse unit to obtain a data signal; according to the data signal and the programming signal to verify whether the anti-fuse unit is programmed correctly.

In one embodiment, the step of verifying whether the anti-fuse unit is correctly programmed according to the data signal and the programming signal further includes: comparing the data signal and the programming signal, according to the comparison result of the data signal and the programming signal determines whether the programming of the anti-fuse unit is correct.

In one embodiment, according to the comparison result of the data signal and the programming signal, the step of determining whether the programming of the anti-fuse unit is correct further includes: the data signal is consistent with the programming signal, and the programming of the anti-fuse unit is correct; the data signal is inconsistent with the programming signal, and the programming of the anti-fuse unit is wrong.

In an embodiment, the step of programming the anti-fuse unit according to the programming signal further includes: the programming signal indicates that the anti-fuse unit is not broken down.

The method for verifying the programming state of the anti-fuse provided by the embodiment of the present disclosure can use the programming signal and the data signal obtained by reading the anti-fuse unit to verify the programming state of the anti-fuse unit in real time without passing through a test machine Verifying the programming state of the anti-fuse unit can quickly verify whether the anti-fuse unit has been burned through by mistake, saving time, meanwhile the verification accuracy is high.

BRIEF DESCRIPTION OF THE DRAWINGS

FIG. 5 is the true signal value table.

DETAILED DESCRIPTION OF THE PREFERRED EMBODIMENTS

Embodiments of the anti-fuse circuit and the method for verifying the programming state of the anti-fuse provided by the present disclosure will be described in detail below in conjunction with the accompanying drawings.

Figure 1:
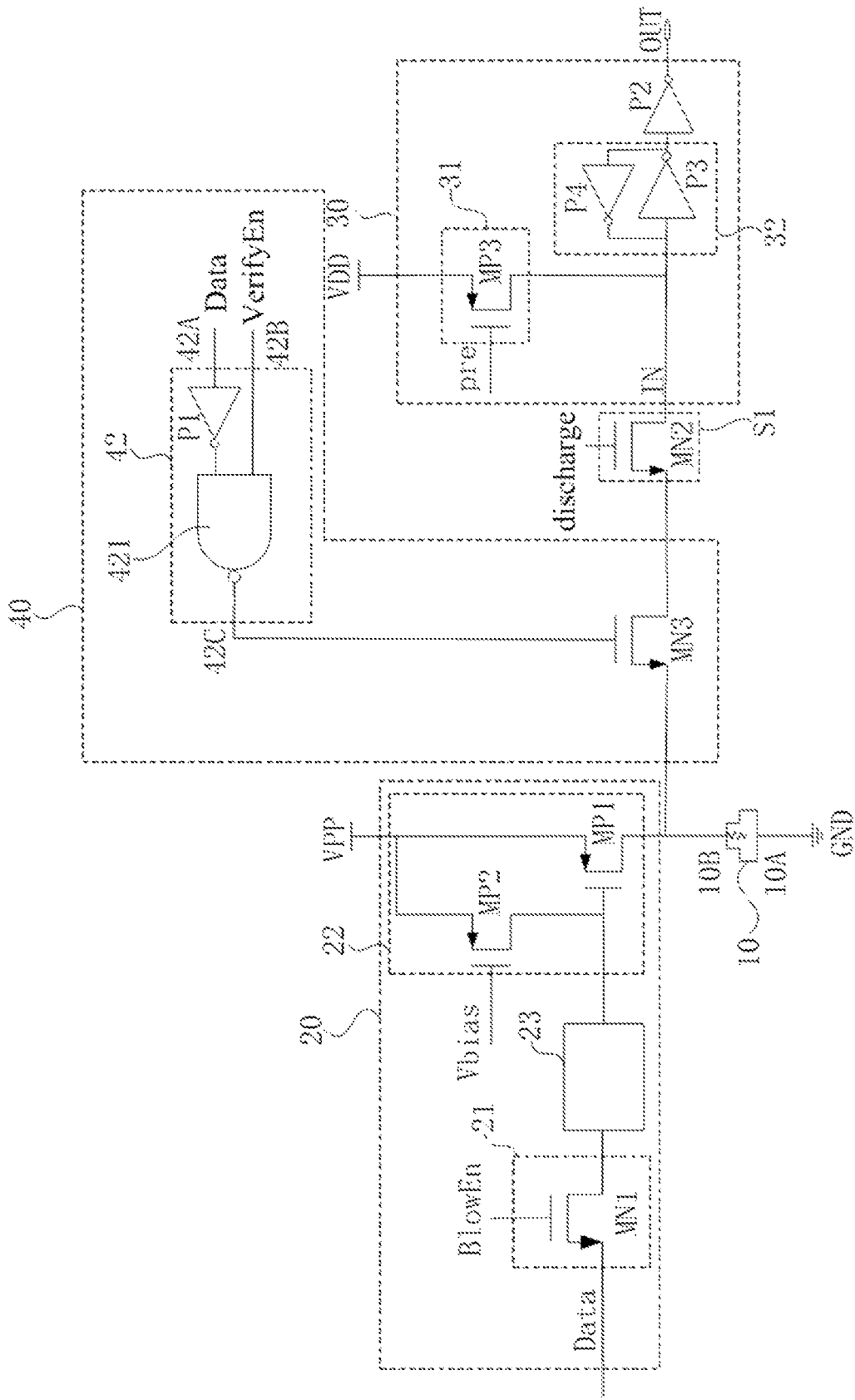
FIG. 1 is a schematic diagram of an anti-fuse circuit according to a first embodiment of the present disclosure.

FIG. 1 is a schematic diagram of an anti-fuse circuit according to the first embodiment of the present disclosure. Please refer to FIG. 1. The anti-fuse circuit includes an anti-fuse unit 10, a programming circuit 20, a read unit 30 and a verification control unit 40. The programming circuit 20 is connected to the anti-fuse unit 10, and programs the anti-fuse unit 10 according to the programming control signal BlowEn; the read unit 30 reads the antifuse unit 10 to obtain a data signal; the verification control unit 40 verifies the programming state of the antifuse unit 10 according to the verification enable signal VerifyEn and the programming signal Data of the antifuse unit 10 to control the electrical connection between the read unit 30 and the antifuse unit 10.

In this embodiment, the anti-fuse unit 10 includes a first terminal 10A and a second terminal 10B. The first terminal 10A is grounded to GND, and the second terminal 10B can be electrically connected to the input terminal of the read unit 30 and the programming unit 20. A high voltage is applied between the first terminal 10A and the second terminal 10B of the anti-fuse unit 10, and the high voltage can break down the medium of the anti-fuse unit 10, so that the anti-fuse unit 10 changes from an insulating state to a conductive state, to realize the storage of information. After performing the programming operation on the anti-fuse unit 10, if the anti-fuse unit 10 is in a conducting state, it means that the anti-fuse unit 10 is burned through; if the anti-fuse unit 10 is in an insulating state, it means that the anti-fuse unit 10 is not burned through. In this embodiment, the programming signal Data indicates that the anti-fuse unit is not burned through.

In this embodiment, the programming circuit 20 is connected to the anti-fuse unit 10 for programming the anti-fuse unit 10 according to the programming control signal BlowEn and the programming signal Data, that is, the programming control signal BlowEn serves as an enable signal of the programming circuit 20. When the anti-fuse unit 10 needs to be programmed, the programming control signal BlowEn enables the programming circuit 20, and the programming signal Data executes the programming operation on the anti-fuse unit 10.

As an example, this embodiment also provides a structure of the programming circuit 20. The programming circuit 20 includes a programming control unit 21 and a signal conversion unit 22.

The programming control unit 21 uses the programming control signal BlowEn as an enabling signal to transmit the programming signal Data to the signal conversion unit 22. For example, in this embodiment, the programming control unit includes a first NMOS transistor MN1, the control terminal of the first NMOS transistor MN1 is connected to the programming control signal BlowEn, and one terminal of the first NMOS transistor MN1 is connected to the programming signal Data, and the other terminal is connected to the signal conversion unit 22. When programming is required, the programming control signal BlowEn is set to 1, so that the first NMOS transistor MN1 is turned on, and the programming signal Data is transmitted to the signal conversion unit 22. In the embodiment, 1 represents a logic high level, and 0 represents a logic low level.

One terminal of the signal conversion unit 22 is connected to the programming voltage VPP, and the other terminal is connected to the anti-fuse unit 10, and uses the programming signal Data as a control signal to realize programming of the anti-fuse unit 10. For example, in this embodiment, the signal conversion unit 22 includes a first PMOS transistor MP1 and a second PNOS transistor MP2, one terminal of the first PMOS transistor MP1 is connected to the programming voltage VPP, and the other terminal is connected to the anti-fuse unit 10 connected, the control terminal of the first PMOS transistor MP1 receives the programming signal Data. One terminal of the second PNOS transistor MP2 is connected to the programming voltage VPP, and the other terminal is connected to the control terminal of the first PMOS transistor MP1, and the control terminal of the second PNOS transistor MP2 receives a bias signal, wherein the bias voltage Vbias of the set signal is smaller than the programming voltage VPP.

When the anti-fuse unit 10 needs to be programmed, the programming signal Data is set to 0, the programming control signal BlowEn is set to 1, the first NMOS transistor MN1 is turned on, and the programming The signal Data controls the conduction of the first PMOS transistor MP1, and the voltage difference between the two ends of the anti-fuse unit 10 is the voltage difference between the programming voltage VPP and the ground terminal GND, thereby realizing the breakdown and burning of the anti-fuse unit 10. If the programming signal Data is set to 1, the first PMOS transistor MP1 is not turned on, and the anti-fuse unit 10 is not broken down.

In this embodiment, the programming circuit 20 further includes an amplifying unit 23, and the programming signal Data output by the programming control unit 21 is transmitted to the signal conversion unit 22 after passing through the amplifying unit 23.

In the above example, the first terminal 10A of the anti-fuse unit 10 is grounded to GND, and the second terminal 10B is electrically connected to the input terminal IN of the read unit 30 and the programming circuit 20. It can be understood that, in another In some examples, the first terminal of the anti-fuse unit 10 is connected to the programming voltage, and the second terminal is connected to the input terminal of the read unit and the programming circuit, and the programming circuit is connected to the ground terminal GND.

Please continue to refer to FIG. 1, the input terminal IN of the read unit 30 is connected to the second terminal 10B of the anti-fuse unit 10, and the anti-fuse unit 10 is read to obtain a data signal, and the output terminal OUT of the read unit 30 outputs signal. The input signal EFDAT of the input terminal IN of the read unit 30 is affected by the anti-fuse unit 10, the read unit 30 reads the anti-fuse unit 10 to obtain a data signal and uses the data signal as an output signal EFOUT output to the output terminal OUT. In this embodiment, if the anti-fuse unit 10 is burned through, the anti-fuse unit 10 is turned on, and the data signal read from the anti-fuse unit 10 is a ground terminal GND signal, so The data signal is 0, the input signal EFDAT of the input terminal IN of the read unit 30 is pulled low; if the anti-fuse unit 10 is not burned through, the anti-fuse unit 10 is not turned on, then the data signal of the anti-fuse unit 10 is not the ground GND signal, but the data signal is 1, and the input signal EFDAT of the input terminal IN of the read unit 30 remains 1.

As an example, this embodiment provides a circuit structure of the read unit 30. The read unit 30 includes a pre-charge unit 31 and a latch 32.

The pre-charging unit 31 is used for pre-charging the input terminal of the read unit 30 according to the pre-charging control signal pre to pre-charge the latch 32.

In some embodiments, the pre-charging unit 31 includes a second transistor. The first terminal of the second transistor is connected to the power supply voltage VDD, the second terminal of the second transistor is connected to the input terminal IN of the read unit 30, and the gate of the second transistor receives the pre-charge control signal pre. Specifically, please refer to FIG. 1. In this embodiment, the second transistor is a third PMOS transistor MP3, the first terminal of the third PMOS transistor MP3 is connected to the voltage VDD. The second terminal of the third PMOS transistor MP3 is connected to the input terminal IN of the read unit 30, and the gate of the third PMOS transistor MP3 receives the pre-charge control signal pre. When the pre-charging control signal pre is set to 0, the third PMOS transistor MP3 is turned on, the input terminal IN of the read unit 30 is connected to the power supply voltage VDD, and the pre-charging unit 31 charges the input terminal IN of the reading of the unit 30, and the voltage of the input terminal IN of the read unit 30 is pulled up, so that the input signal EFDAT of the input terminal IN of the read unit 30 is 1.

The input terminal of the latch 32 is electrically connected to the input terminal IN of the read unit 30, and the output terminal is electrically connected to the output terminal OUT of the read unit 30. The latch 32 can latch the input signal EFDAT of the input terminal IN of the read unit 30. In this embodiment, the latch includes a third inverter P3 and a fourth inverter P4, and the third inverter P3 and the fourth inverter P4 are connected end to end, wherein the input terminal third inverter P3 is electrically connected to the input terminal IN of the read unit 30, the output terminal of the third inverter P3 is electrically connected to the output terminal OUT of the read unit 30, and the input terminal of the fourth inverter P4 is electrically connected to the output terminal OUT of the read unit 30. The input terminal of the fourth inverter P4 is electrically connected to the output terminal of the third inverter P3, and the output terminal of the fourth inverter P4 is electrically connected to the input end of the third inverter P3. connected to realize the function of the latch.

In this embodiment, the antifuse circuit further includes a read switch unit S1, and the read switch unit S1 is used to control the electrical connection between the read unit 30 and the antifuse unit 10 according to the read enable signal discharge. In some embodiments, the read switch unit S1 includes a third transistor, the first terminal of the third transistor is connected to the second terminal of the antifuse unit 10, and the second stage of the third transistor is connected to the input terminal IN of the read unit 30, the gate of the third transistor receives the read enable signal discharge. Specifically, referring to FIG. 1, in this embodiment, the third transistor is a second NMOS transistor MN2. When the read enable signal discharge is set to 1, the second NMOS transistor MN2 is turned on, and the read unit 30 is electrically connected to the anti-fuse unit 10, and the read unit 30 can detect the antifuse unit 10. The anti-fuse unit 10 is read to obtain a data signal. It can be understood that, when the programming circuit 20 programs the anti-fuse unit 10, the read enable signal discharge is set to 0, the read switch unit S1 is disconnected, and the read unit 30 is not connected to the anti-fuse unit 10.

In this embodiment, the read unit 30 further includes a second inverter P2, and the second inverter P2 is arranged between the latch 32 and the output terminal OUT of the read unit 30, to shape the signal output by the latch 32.

In this embodiment, when performing read/write amplification on the anti-fuse unit 10, the read enable signal discharge is first set to 0, the read switch unit S1 is turned off, and the pre-charge unit 31 charges the input terminal IN of the read unit 30, so that the input terminal IN of the read unit 30 is set to 1; the read enable signal discharge is set to 1 again, the read switch unit S1 is turned on, and the input terminal of the read unit IN is connected to the second terminal 10B of the anti-fuse unit 10, if the anti-fuse unit 10 is burned through, the input terminal of the read unit 30 becomes 0, and the output terminal OUT outputs 0. If the anti-fuse unit 10 is not burned through, the input terminal of the read unit 30 remains 1, and the output terminal OUT outputs 1.

When the verification control unit 40 is used for verifying the programming state of the antifuse unit 10, the read unit 30 is controlled to be electrically connected to the anti-fuse unit 10 according to the verification enable signal VerifyEn and the programming signal Data of the anti-fuse unit 10.

In this embodiment, the verification control unit 40 includes a first transistor and a signal receiving unit 42. The first terminal of the first transistor is electrically connected to the anti-fuse unit 10, and the second terminal is electrically connected to the input terminal IN of the read unit 30. When verifying the programming state of the anti-fuse unit, when the programming signal indicates that the anti-fuse unit 10 is not burned through, the signal receiving unit 42 controls the first transistor to be turned on. In some embodiments, the first transistor is an NMOS transistor, specifically, in this embodiment, the first transistor is a third NMOS transistor MN3, and the output signal of the signal receiving unit 42 is used as the first control signal of the three NMOS transistors MN3, the first terminal of the third NMOS transistor MN3 is electrically connected to the anti-fuse unit 10, the second terminal of the third NMOS transistor MN3 is electrically connected to, for example, the input terminal IN of the read unit 30 through the read switch unit S1, when verifying the programming state of the anti-fuse unit 10, if the programming signal represents the anti-fuse unit 10 is not burned through, then the signal receiving unit 42 controls the third NMOS transistor MN3 to be turned on.

The signal receiving unit 42 includes a first input terminal 42A, a second input terminal 42B and an output terminal 42C. The first input terminal 42A receives the programming signal Data, the second input terminal 42B receives the verification enable signal VerifyEn, and the output terminal 42C is electrically connected to the control terminal of the first transistor. In this embodiment, the signal receiving unit 42 includes a NAND gate 421 and a first inverter P1, the output terminal of the NAND gate 421 serves as the output terminal 42C of the signal receiving unit 42, and the first input terminal 42A is electrically connected to one input terminal of the NAND gate 421 via the first inverter P1, and the other input terminal of the NAND gate 421 is connected to the second input terminal 42B of the signal receiving unit 42 electrical connection.

In the anti-fuse circuit provided by the embodiment of the present disclosure, after the programming of the anti-fuse unit 10 is completed, the verification control unit can control the electrical connection between the read unit and the anti-fuse unit, and enter the verify mode, so that the anti-fuse unit 10 can be verified in real time. It can be understood that, when the read unit 30 performs a read-write amplification operation, the first transistor remains in a conductive state, so as to avoid affecting the connection between the anti-fuse unit 10 and the read unit 30.

Figure 2:
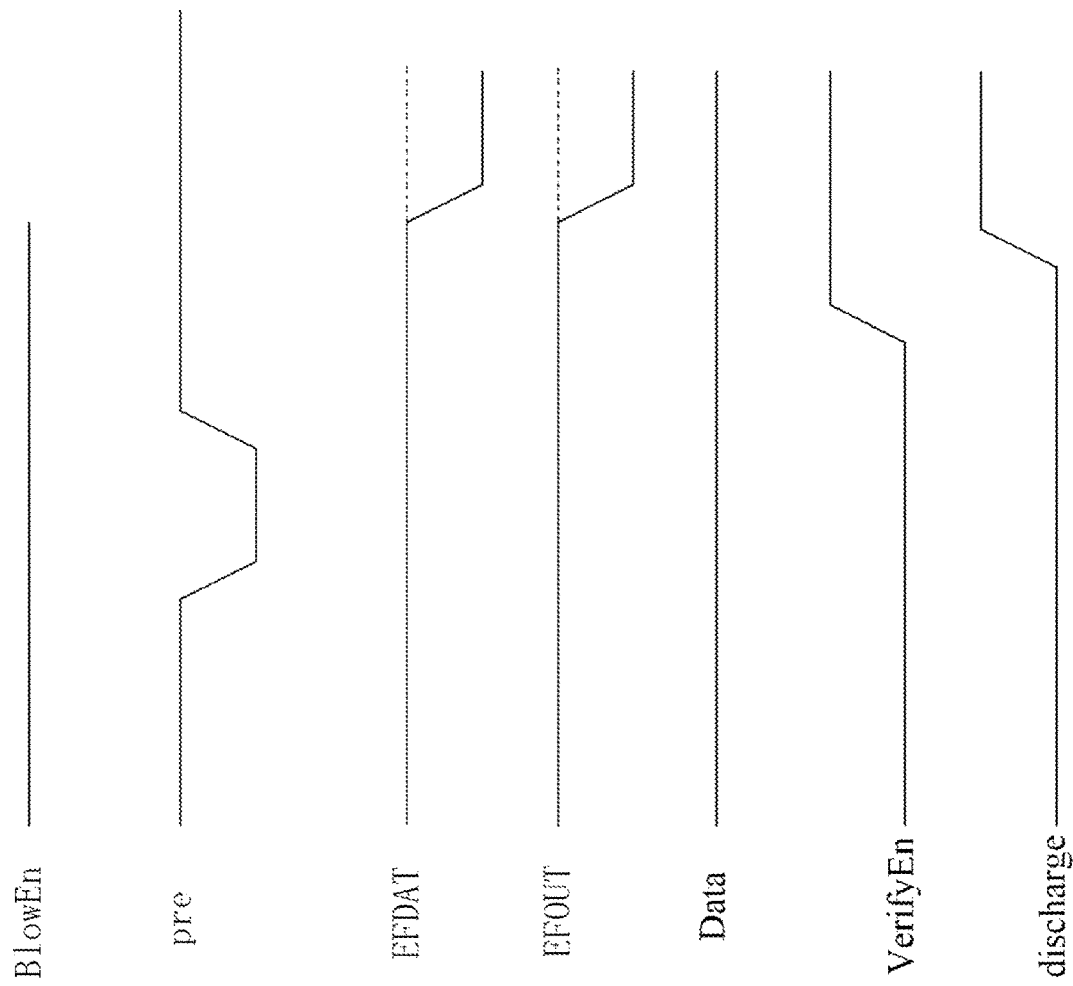
FIG. 2 is a signal timing diagram of the anti-fuse circuit according to the first embodiment of the present disclosure.
Figure 3:
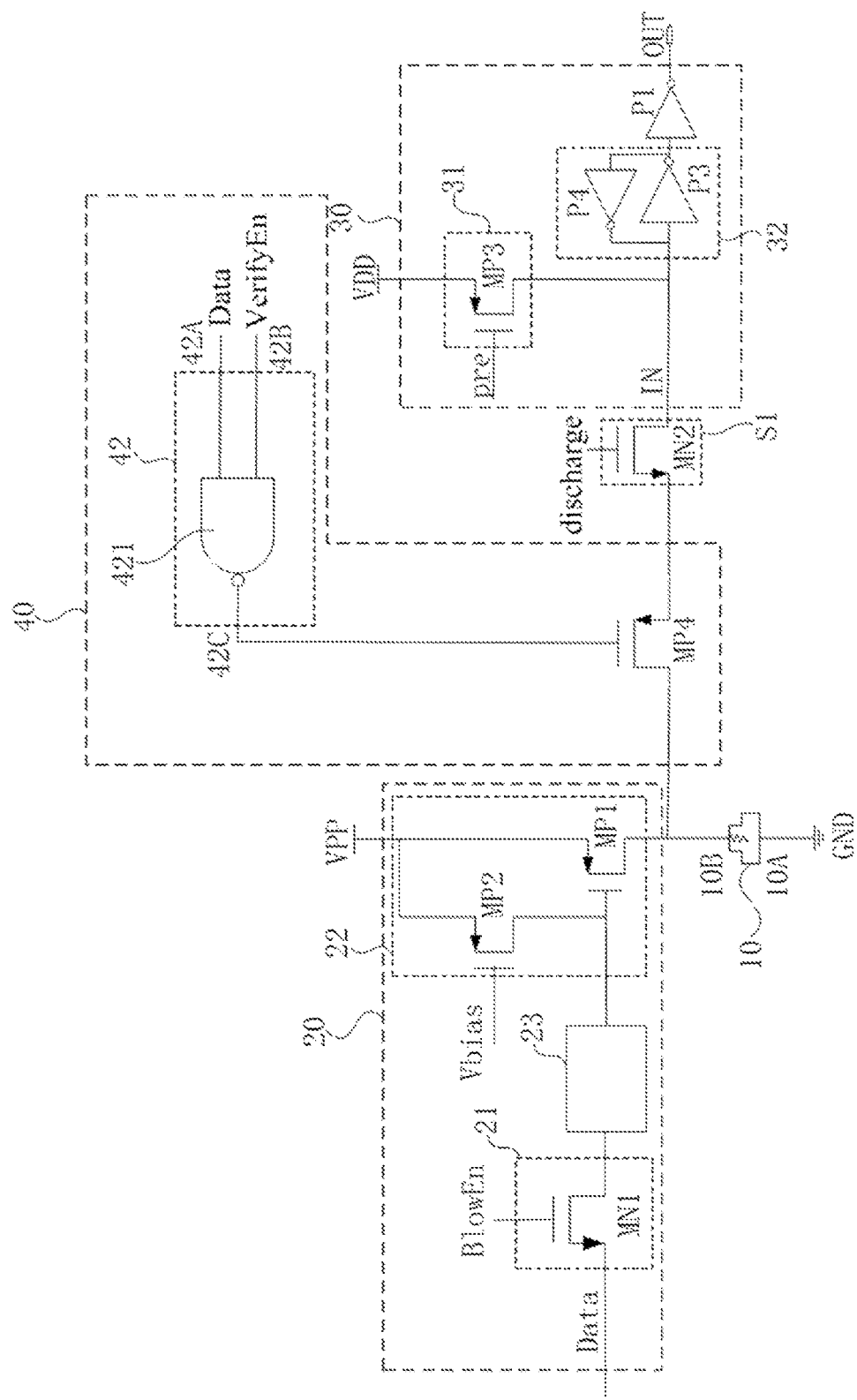
FIG. 3 is a circuit diagram of an anti-fuse circuit according to a second embodiment of the present disclosure.

FIG. 2 is a signal timing diagram of the anti-fuse circuit according to the first embodiment of the present disclosure. Please refer to FIG. 2. After the anti-fuse unit 10 completes the breakdown and programming, it enters the verification mode. In the verification mode, the programming control signal BlowEn of the programming unit is set to 0, the pre-charging control signal pre is set to 0, the pre-charging unit 31 of the read unit 30 charges the latch 32, and the input signal EFDAT of the input terminal IN of the read unit 30 is set to 1, and the output signal EFOUT of the output terminal OUT of the read unit 30 outputs 1. After charging, the pre-charge control signal pre is set to 1, the verification enable signal VerifyEn is set to 1, the read enable signal discharge is set to 1, and the read unit 30 is connected to the anti-fuse unit 10. If the programming signal Data is 1 (that is, the anti-fuse unit 10 does not need to be programmed), and the output signal EFOUT (that is, the data signal) of the output terminal OUT of the read unit 30 is 1 (as indicated by the dotted line in FIG. 2 shown), indicating that the real state of the anti-fuse unit 10 is not programmed, the real state is consistent with the programming signal, and the programming of the anti-fuse unit 10 is correct; if the programming signal Data is 1 (that is, the anti-fuse unit 10 does not need to be programmed), and the output signal EFOUT of the output terminal OUT of the read unit 30 is 0 (as shown by the solid line in FIG. 2), indicating that the real state of the anti-fuse unit 10 is for programming, the actual state is inconsistent with the programming signal, and the anti-fuse unit 10 is programmed by mistake. It can be seen that the anti-fuse circuit of the present disclosure does not need to verify the programming state of the anti-fuse unit 10 through a test machine, but can verify the programming status of the anti-fuse unit 10 in real time, and can quickly verify the anti-fuse whether the anti-fuse unit 10 is burned through by mistake, saves time and has high verification accuracy As an example, the second embodiment of the present disclosure also provides an anti-fuse circuit, please refer to FIG. 3, which is a circuit diagram of the anti-fuse circuit according to the second embodiment of the present disclosure. The difference between the second embodiment and the first embodiment is that the first transistor of the verification control unit is the fourth PMOS transistor MP4, the signal receiving unit 42 includes a NAND gate 421, and does not include the first inverter P1. The two input terminals of the NAND gate 421 are respectively electrically connected to the first output terminal 42A and the second input terminal 42B, and the output terminal of the NAND gate 421 serves as the output terminal 42C of the signal receiving unit 42. When the verification enable signal VerifyEn and the programming signal Data are both 1, the signal receiving unit 42 outputs 0, the verification switch unit 41 is turned on, and the read unit 30 and the anti-fuse Unit 10 are connected.

Figure 4:
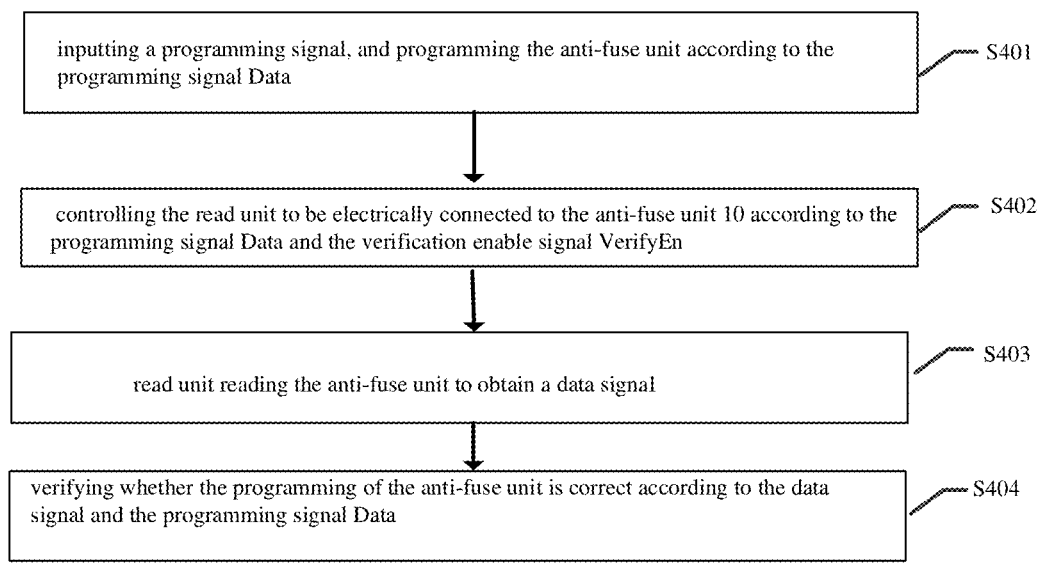
FIG. 4 is a flow chart showing the steps of the method for verifying the programming state of the anti-fuse unit according to a third embodiment of the present disclosure.

An embodiment of the present disclosure also provides a method for verifying the programming state of an anti-fuse unit, and the verification method adopts the above-mentioned anti-fuse circuit. FIG. 4 illustrates the steps of the method for verifying the programming status of the anti-fuse unit according to the third embodiment of the present disclosure. Please refer to FIG. 1 and FIG. 4. The method includes:

Step S401, inputting a programming signal, and programming the anti-fuse unit 10 according to the programming signal Data.

Specifically, in this embodiment, the programming control signal BlowEn enables the programming unit 20 of the anti-fuse circuit, so that the programming circuit can determine whether to execute the program on the anti-fuse unit 10 and perform the programming operation according to the programming signal Data. For example, in this embodiment, the programming signal Data is input by the programming control unit 21 as the control signal of the signal conversion unit 22, if the programming signal Data representing the anti-fuse unit 10 is not burned through, the programming signal Data is 1, and if the programming signal Data representing the anti-fuse unit 10 is burned through, the programming signal Data is 0.

Step S402, controlling the read unit 30 to be electrically connected to the anti-fuse unit 10 according to the programming signal Data and the verification enable signal VerifyEn.

In this step, the programming signal Data and the verification enable signal VerifyEn are used as input signals of the verification control unit 40, and the verification control unit 40 controls the electrical connection of the read unit 30 and the antifuse unit 10 according to the verification enable signal VerifyEn and the programming signal Data of the antifuse unit 10. After the anti-fuse unit 10 completes the breakdown programming, the verification enable signal VerifyEn is set to 1, and the programming signal Data is set to 1. The programming signal Data indicates that the anti-fuse unit 10 is not burned through, and enters verification mode, that is, the verification mode is a mode for verifying if the anti-fuse unit 10 is mistakenly burned through. If the programming signal Data is set to 0, the programming signal Data indicates that the anti-fuse unit 10 is burned through, the verification enable signal VerifyEn is set to 1, and the verification control unit 40 cannot control the read unit 30 to connect with the anti-fuse unit 10. It can be understood that, when the read unit 30 performs the read amplification operation, it is necessary to set the programming signal Data and the verification enable signal VerifyEn to keep the verification switch unit 41 in a conductive state, so as to avoid affecting the connection between the read unit 30 and the anti-fuse unit 10.

Step S403, the read unit 30 reads the anti-fuse unit 10 to obtain a data signal. In this step, if the anti-fuse unit 10 is burned through, the data signal read when the anti-fuse unit 10 is read is 0, and the input signal EFDAT of the input terminal IN of the read unit 30 also becomes 0. If the anti-fuse unit 10 is not burned through, the data signal read from the anti-fuse unit 10 is 1, and the input of the input terminal IN of the read unit 30 is the signal EFDAT kept as 1, and the read unit 30 outputs an output signal EFOUT according to the input signal EFDAT, and the output signal EFOUT is related to the data signal when the anti-fuse unit 10 is read, thereby realizing the read unit 30 to read the data signal of the anti-fuse unit 10. In this embodiment, the output signal EFOUT of the read unit is consistent with the data signal of the anti-fuse unit 10, that is, if the data signal of the anti-fuse unit 10 is 1, and the output signal of the read unit EFOUT is also 1, if the data signal of the anti-fuse unit 10 is 0, and the output signal EFOUT of the read unit is also 0. It can be understood that, in other embodiments of the present disclosure, the output signal EFOUT of the read unit and the data signal of the anti-fuse unit 10 can also be reversed, that is, the data signal of the anti-fuse unit 10 is 1. The output signal EFOUT of the read unit is 0, the data signal of the anti-fuse unit 10 is 0, and the output signal EFOUT of the read unit is 1.

Step S404, verifying whether the programming of the anti-fuse unit 10 is correct according to the data signal and the programming signal Data.

In this step, the data signal (that is, the output signal EFOUT of the output terminal OUT of the read unit 30) is compared with the programming signal Data, and determined according to the comparison result between the data signal and the programming signal Data, to see if the programming of the anti-fuse unit 10 is correct. If the data signal is consistent with the programming signal Data, the anti-fuse unit 10 is correctly programmed; if the data signal is inconsistent with the programming signal Data, the anti-fuse unit 10 is incorrectly programmed.

Specifically, please refer to FIG. 5, which is the true signal value table. If the programming signal Data is 1 (that is, it indicates that the anti-fuse unit 10 has not been programmed), the data signal (that is, the read output signal EFOUT on the output terminal OUT of the unit 30 is 1, the real state of the anti-fuse unit 10 is not programmed, which is consistent with the representation of the programming signal, that is, the data signal and the programming signal Data are consistent, the programming of the anti-fuse unit 10 is correct; if the programming signal Data is 1 (that is, it indicates that the anti-fuse unit 10 is not programmed), the data signal (that is, the 30 When the output signal EFOUT of the output terminal OUT is 0, the real state of the anti-fuse unit 10 is being programmed, which is inconsistent with the representation of the programming signal, that is, the data signal is inconsistent with the programming signal Data, the anti-fuse unit 10 is programmed incorrectly. It can be understood that, if the programming signal Data is 0 (that is, indicating that the anti-fuse unit 10 is burned through), the verification enable signal VerifyEn is set to 1, and the verification control unit 40 cannot control the read unit 30 communicates with the anti-fuse unit 10, that is, it cannot enter the verification mode.

The method for verifying the programming status of the anti-fuse unit provided by the embodiment of the present disclosure uses the programming signal and the data signal of the anti-fuse unit to verify the programming status of the anti-fuse unit 10 in real time, without passing the test machine to verify the programming status of the anti-fuse unit 10. Verifying the programming state of the anti-fuse unit 10 can quickly verify whether the anti-fuse unit 10 has been burned through by mistake, so it saves time and has high verification accuracy.

The above is only a preferred embodiment of the present invention, it should be pointed out that for those of ordinary skill in the art, without departing from the principle of the present invention, some improvements and modifications can also be made, and these improvements and modifications should also be considered for the protection scope of the present invention.

The invention claimed is:

1. An anti-fuse circuit, comprising:
   an anti-fuse unit;
   a programming circuit, wherein the programming circuit is connected to the anti-fuse unit, configured to program the anti-fuse unit according to a programming control signal and a programming signal;
   a read unit, wherein the read unit is configured to read the anti-fuse unit and obtain a data signal; and
   a verification control unit, wherein the verification control unit is configured to control an electrical connection between the read unit and the anti-fuse unit according to a verification enable signal and the programming signal, when the verification control unit verifies a programming state of the anti-fuse unit;
   wherein the verification control unit comprises:
   a first transistor, wherein a first terminal of the first transistor is connected to the anti-fuse unit, and the second terminal of the first transistor is connected to an input terminal of the read unit; and
   a signal receiving unit, wherein the signal receiving unit comprises a first input terminal, a second input terminal and an output terminal, wherein the first input terminal of the signal receiving unit receives the programming signal, and the second input terminal of the signal receiving unit receives a verification enable signal, wherein the output terminal of the signal receiving unit is electrically connected to a control terminal of the first transistor, wherein the programming signal represents the anti-fuse unit without being burned through, and wherein the signal receiving unit controls turning on of the first transistor, when verifying the programming state of the anti-fuse unit.

2. The anti-fuse circuit according to claim 1, wherein the first transistor is an NMOS transistor.

3. The anti-fuse circuit according to claim 2, wherein the signal receiving unit comprises:

a NAND gate, wherein an output terminal of the NAND gate is the output terminal of the signal receiving unit;

a first inverter, wherein the first input terminal of the signal receiving unit is electrically connected to an input terminal of the NAND gate through the first inverter, and wherein another input terminal of the NAND gate is electrically connected to the second input terminal of the signal receiving unit.

4. The anti-fuse circuit according to claim 1, wherein the first transistor is a PMOS transistor.

5. The anti-fuse circuit according to claim 4, wherein the signal receiving unit comprises:

a NAND gate, wherein the two input terminals of the NAND gate are electrically connected to the first output terminal and the second input terminal of the signal receiving unit respectively, and wherein the output terminal of the NAND gate is the output terminal of the signal receiving unit.

6. The anti-fuse circuit according to claim 1, wherein the anti-fuse unit comprises a first terminal and a second terminal, wherein the first terminal of the anti-fuse unit is grounded, and the second terminal of the anti-fuse unit is electrically connected to the input terminal of the read unit.

7. A method for verifying the programming status of the anti-fuse unit, using the anti-fuse circuit according to claim 1, wherein the method comprises steps of:

inputting the programming signal, and programming the anti-fuse unit according to the programming signal;

controlling the electrical connection between the read unit and the anti-fuse unit according to the programming signal and the verification enable signal;

reading the anti-fuse unit by the read unit to obtain a data signal; and verifying if programming of the anti-fuse unit is correct according to the data signal and the programming signal.

8. The method for verifying the programming status of the anti-fuse unit according to claim 7, wherein the step of verifying if the programming of the anti-fuse unit is correct according to the data signal and the programming signal further comprises:

comparing the data signal and the programming signal, and determining whether the programming of the anti-fuse unit is correct according to the comparison result of the data signal and the programming signal.

9. The method for verifying the programming status of the anti-fuse unit according to claim 8, wherein the step of determining whether the programming of the anti-fuse unit is correct according to the comparison result of the data signal and the programming signal further comprises:

if the data signal is consistent with the programming signal, the programming of the anti-fuse unit is correct; and if the data signal is inconsistent with the programming signal, and the programming of the anti-fuse unit is incorrect.

10. The method for verifying the programming status of the anti-fuse unit according to claim 9, wherein the step of programming the anti-fuse unit according to the programming signal further comprises:

the programming signal indicates that the anti-fuse unit is not burned through.

11. An anti-fuse circuit, comprising:

an anti-fuse unit;

a programming circuit, wherein the programming circuit is connected to the anti-fuse unit, configured to program the anti-fuse unit according to a programming control signal and a programming signal;

a read unit, wherein the read unit is configured to read the anti-fuse unit and obtain a data signal; and a verification control unit, wherein the verification control unit is configured to control an electrical connection between the read unit and the anti-fuse unit according to a verification enable signal and the programming signal, when the verification control unit verifies a programming state of the anti-fuse unit;

wherein the read unit comprises:

a pre-charging unit, wherein the pre-charging unit is configured to pre-charge the input terminal of the read unit according to a pre-charging control signal; and a latch, wherein an input terminal of the latch is electrically connected to the input terminal of the read unit, and an output terminal of the latch is electrically connected to the output terminal of the read unit.

12. The anti-fuse circuit according to claim 11, wherein the pre-charging unit comprises a second transistor, wherein a first terminal of the second transistor is connected to a power supply voltage, a second terminal of the second transistor is connected to the input terminal of the read unit, and a gate of the second transistor receives the pre-charge control signal.

13. The anti-fuse circuit according to claim 11, wherein the anti-fuse circuit further comprises a read switch unit, wherein the read switch unit controls electrical connection of the input terminal of the read unit and the second terminal of the anti-fuse unit according to a read enable signal.

14. The anti-fuse circuit according to claim 13, wherein the read switch unit comprises a third transistor, wherein a first terminal of the third transistor is connected to the second terminal of the anti-fuse unit, and wherein a second terminal of the third transistor is connected to the input terminal of the read unit, and wherein a gate of the third transistor receives the read enable signal.

15. The anti-fuse circuit according to claim 11, wherein the read unit further comprises a second inverter, the second inverter is arranged between the latch and the read unit between the output terminals.

16. A method for verifying the programming status of the anti-fuse unit, using the anti-fuse circuit according to claim 11, wherein the method comprises steps of:

inputting the programming signal, and programming the anti-fuse unit according to the programming signal;

controlling the electrical connection between the read unit and the anti-fuse unit according to the programming signal and the verification enable signal;

reading the anti-fuse unit by the read unit to obtain a data signal; and verifying if programming of the anti-fuse unit is correct according to the data signal and the programming signal.

17. The method for verifying the programming status of the anti-fuse unit according to claim 16, wherein the step of verifying if the programming of the anti-fuse unit is correct according to the data signal and the programming signal further comprises:

comparing the data signal and the programming signal, and determining whether the programming of the anti-fuse unit is correct according to the comparison result of the data signal and the programming signal.

18. The method for verifying the programming status of the anti-fuse unit according to claim 17, wherein the step of determining whether the programming of the anti-fuse unit is correct according to the comparison result of the data signal and the programming signal further comprises:
  if the data signal is consistent with the programming signal, the programming of the anti-fuse unit is correct; and
  if the data signal is inconsistent with the programming signal, and the programming of the anti-fuse unit is incorrect.

19. The method for verifying the programming status of the anti-fuse unit according to claim 18, wherein the step of programming the anti-fuse unit according to the programming signal further comprises:
  the programming signal indicates that the anti-fuse unit is not burned through.

\* \* \* \* \*